US009212929B2

(12) United States Patent
Voronel

(10) Patent No.: US 9,212,929 B2
(45) Date of Patent: Dec. 15, 2015

(54) ROUTING SERVICE FOR COMPUTATION OF A CROSS-STREET ASSOCIATED WITH A GEOGRAPHIC LOCATION

(75) Inventor: Gary Voronel, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 355 days.

(21) Appl. No.: 13/299,359

(22) Filed: Nov. 18, 2011

(65) Prior Publication Data

US 2013/0130709 A1    May 23, 2013

(51) Int. Cl.
*G01C 21/26* (2006.01)
*G01C 21/34* (2006.01)
*G01C 21/36* (2006.01)
*G01C 21/32* (2006.01)

(52) U.S. Cl.
CPC ........ *G01C 21/3667* (2013.01); *G01C 21/3461* (2013.01); *G01C 21/3476* (2013.01); *G01C 21/3644* (2013.01); *G01C 21/32* (2013.01); *G01C 21/367* (2013.01); *G01C 21/3632* (2013.01)

(58) Field of Classification Search
CPC ........... G01C 21/3632; G01C 21/3644; G01C 21/367; G01C 21/32; G01C 21/3461; G01C 21/26; G01C 21/34; G01C 21/3407; G01C 21/3476; G01C 21/3667; G01C 21/3676
USPC ......... 701/410, 425, 426, 437, 438, 454, 526; 455/456.1, 456.3
See application file for complete search history.

(56) References Cited

U.S. PATENT DOCUMENTS

| | | | |
|---|---|---|---|
| 6,049,755 A * | 4/2000 | Lou et al. ....................... 701/455 |
| 6,184,823 B1 * | 2/2001 | Smith et al. .............. 342/357.31 |
| 6,453,237 B1 | 9/2002 | Fuchs et al. |
| 6,662,101 B2 * | 12/2003 | Adachi .......................... 701/420 |
| 6,693,564 B2 * | 2/2004 | Niitsuma ................... 340/995.2 |
| 6,804,603 B2 * | 10/2004 | Ukita ............................. 701/426 |
| 6,810,327 B2 * | 10/2004 | Akashi .......................... 701/428 |
| 7,116,985 B2 | 10/2006 | Wilson et al. |
| 7,496,484 B2 * | 2/2009 | Agrawala et al. ................. 703/2 |
| 7,899,615 B2 | 3/2011 | Arnold-Huyser et al. |
| 8,340,894 B2 * | 12/2012 | Yester ........................... 701/301 |

(Continued)

OTHER PUBLICATIONS

"Walk this way", Retrieved at <<http://googlemobile.blogspot.com/2010/09/walk-this-way.html>>, Sep. 9, 2010.

(Continued)

*Primary Examiner* — Jason Holloway
(74) *Attorney, Agent, or Firm* — Steven Spellman; Mickey Minhas

(57) ABSTRACT

Architecture that computes cross-streets of a geographic location using a dynamic routing service. This also means execution can be local on a mobile device without the need to build an additional index of locations and associated cross-streets. Accordingly, the user can now find the cross-streets of a particular location rather than simply the street address. Upon receiving geolocation data for the geographic location, for which the nearest cross-streets are being determined, routing points from which routes are generated to the main point of interest are selected to be sufficiently distant from the main point of interest, since if the routing points are too close, the route may not yield a route sufficiently detailed from which the cross-streets can be inferred. The output is then cross-streets on either side of the geographic location as a means for providing a quick reference to a user seeking the location.

21 Claims, 7 Drawing Sheets

(56) References Cited

U.S. PATENT DOCUMENTS

| | | | |
|---|---|---|---|
| 8,560,224 B2* | 10/2013 | Vu et al. | 701/410 |
| 8,676,496 B2* | 3/2014 | Ishibashi et al. | 701/426 |
| 8,756,006 B2* | 6/2014 | Yamashita et al. | 701/437 |
| 8,903,639 B2* | 12/2014 | Yester | 701/301 |
| 2001/0044694 A1* | 11/2001 | Ukita | 701/211 |
| 2003/0130788 A1* | 7/2003 | Akashi | 701/209 |
| 2003/0158661 A1* | 8/2003 | Chen et al. | 701/210 |
| 2006/0195257 A1* | 8/2006 | Nakamura | 701/211 |
| 2008/0249709 A1* | 10/2008 | Tran | 701/209 |
| 2008/0312814 A1* | 12/2008 | Broadbent et al. | 701/200 |
| 2009/0018764 A1* | 1/2009 | Ishibashi et al. | 701/201 |
| 2009/0216434 A1* | 8/2009 | Panganiban et al. | 701/208 |
| 2010/0121562 A1* | 5/2010 | Nesbitt | 701/200 |
| 2010/0250619 A1* | 9/2010 | Hulubei | 707/803 |
| 2011/0130956 A1 | 6/2011 | Tracton et al. | |

OTHER PUBLICATIONS

"NYC Cross Streets for iPhone", Retrieved at <<http://download.cnet.com/NYC-Cross-streets/3000-12940_4-75077961.html>>, Retrieved Date: Oct. 11, 2011.

* cited by examiner

ROUTING SERVICE FOR COMPUTATION OF A CROSS-STREET ASSOCIATED WITH A GEOGRAPHIC LOCATION

BACKGROUND

In the ever-evolving mobile society, users can employ mobile devices to assist in finding many different types of information. For example, geolocation capabilities associated with mobile devices enable the user to retrieve maps to desired destinations. Additionally, search engines enable the user to then find an address to a given destination. However, these services simply show the street address, employ time-consuming compilation of the cross-streets indexes for a particular set of address entities, or use rules such as "850 Main St. must be on Main St. between 8th and 9th Avenues". In many instances, destination addresses are not considered to be useful, and especially if not obtained timely and not according to commonly known junctions.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture computes cross-streets relative to a geographic location (e.g., business) using a dynamic routing service. This also means execution can be local (e.g., on a mobile device) without the need to build an additional index of locations and associated cross-streets. Accordingly, the user can now find the cross-streets relative to a particular geographic location in realtime rather than simply the street address.

The geographic location, for which the nearest cross-streets are being determined, is also referred to as the main point of interest. Routing points are those points from which routes are generated to the main point of interest as part of computing the cross-streets. The routing points are selected to be sufficiently distant from the main point of interest, since if the routing points are too close, the route may not yield a route sufficiently detailed from which the cross-streets can be inferred. In one implementation, an algorithm can be provided that incrementally increases the distance of the routing points from the main point of interest until the routes generated contain the necessary information, namely, the nearby cross-streets.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
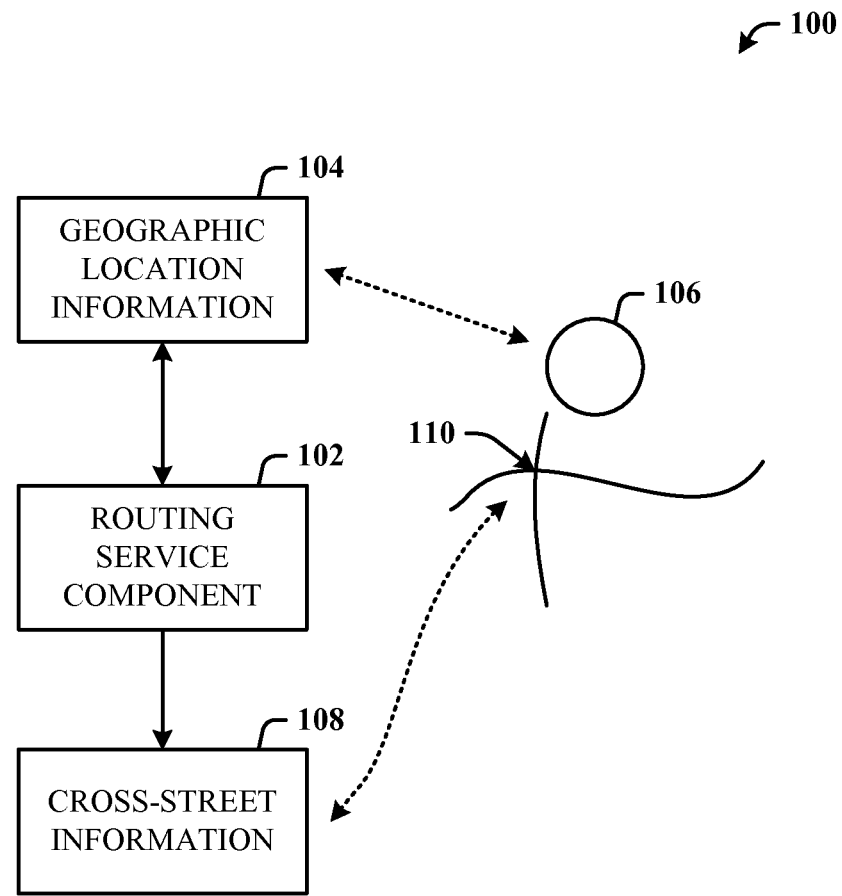
FIG. 1 illustrates a system in accordance with the disclosed architecture.

The disclosed architecture solves at least the existing problem where a user wants to know the cross-streets of a particular geographic location rather than simply the street address (which may not be that useful). The architecture computes the cross-streets (cross-street information such as Street A and Avenue B) for a location using a dynamic routing engine. This further means that the routing component can be executed locally on a mobile device, such as a cell phone, without the necessity of conventional implementations that build an additional index of locations and the associated cross-streets. Note the term "street" is not intended to be limited to a formal "street" such as ABC Street, as identified conventionally on maps, etc., but is generally intended to cover formal representations of streets, avenues, country roads, county roads, highways, farm-to-market roads, riding trails, hiking trails, etc., and any other routes to/from/by commonly traveled relative to geographic locations.

The disclosed architecture utilizes existing routing (routes) services to compute the cross-streets of a road junction. The cross-streets can be computed using an existing service resident on a mobile device without having to access a network (e.g., Internet-based service); thus, the processing is fast. Moreover, the cross-streets (street identifications) can be determined using an existing service resident on a mobile device without the need to store a large geocoding index on the device; thus, saving on storage space. The routes utilized can be very small (short); accordingly, the processing time is extremely fast.

The input to the architecture is a geographic location, as defined using latitude and longitude data, for example. The geographic location, for which the nearest cross-streets are being determined, is also referred to as the main point of interest. The architecture then chooses several points nearby (e.g., equidistant) from the location in different directions (e.g., from north, from south, from east, and from west) and then calculates the routes from these locations. These nearby points can be referred to as routing points, which are those points from which routes are generated to the main point of interest as part of computing the cross-streets. The routing points are selected to be sufficiently distant from the main point of interest, since if the routing points are too close, the route may not yield a route sufficiently detailed from which the cross-streets can be inferred. Thus, the routing points are the points near the main point of interest, but at least a minimum distance from the main point of interest. The routing points can be close to the given geographic location; thus, the routes do not need to be long.

In one implementation, an algorithm can be provided that incrementally increases the distance of the routing points from the main point of interest until the routes generated contain the necessary information, namely, the nearby cross-streets.

An existing routing service already returns information such as Street A (the street of the given location), Street B (the street of the last intersection before the destination), and Street C (the street of the next intersection after the destination, e.g., "if you hit this street, you've gone too far"). The cross-streets can then be computed and provided to the device user as a reference to a primary street that is nearest the location and the site of the location between two secondary cross-streets (e.g., "on street A between street B and street C").

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a system 100 in accordance with the disclosed architecture. The system 100 includes a routing service component 102 that processes geographic location information 104 of a geographic location 106 (also main point of interest) and dynamically outputs cross-street information 108 (e.g., nearest) of a road junction 110 associated with the geographic location 106. The geographic location information 104 can be obtained via a location-based system such as GPS (global positioning system), a triangulation architecture, and any other technologies that provide suitable geographic location information 104 as input to the routing service component 102. (Note that where the user location can be ascertained by geolocation coordinates, the user can be given the option to opt-in to allow coordinate access or opt-out to prevent coordinate exposure.)

More specifically, the routing service component 102 receives the location information 104 and computes one or more routes of travel to the location 106 (hence, the term "routing" for computing the routes), which are ultimately used to compute the cross-streets.

The routing service component 102 can operate (solely) on a mobile device such as a cell phone or other mobile-capable device, solely on a server, or across both the mobile device and the server (e.g., in accordance with load balancing). The routing service component 102 can operate on a mobile device to compute the cross-street information 108 of a road junction 110 without necessarily accessing a network service to compute the cross-street information 108. The geographic location information 104 can be geographical coordinates that include latitude and longitude.

The routing service component 102 computes points (e.g., intersecting roads) about (e.g., around or equidistant) and in different directions from the geographic location 106 and computes routes between the geographic location 106 and the points. The term "about" means selecting a routing point of a sufficient distance from the main point of interest to compute a route. The routing service component 102 computes the cross-street information 108 dynamically on a mobile device, a server, or across both the mobile device and the server. The routing service component 102 computes the cross-street information on a mobile device absent rebuild of an index of locations and road junctions.

The routing service component 102 coordinates computation of the cross-street information 108 using resources on both a client and a network service. In other words, based on the hardware and/or software capabilities of the mobile device, the processing load can be shared with a cloud service, for example, such that the cross-street information 108 can be more efficiently provided by the mobile device.

It is within contemplation of the subject architecture that the road junction 110 can be a three-way junction of three different streets, or a four-way junction of four different streets, any of which can be dynamically computed and provided to the user via the mobile device.

Figure 2:
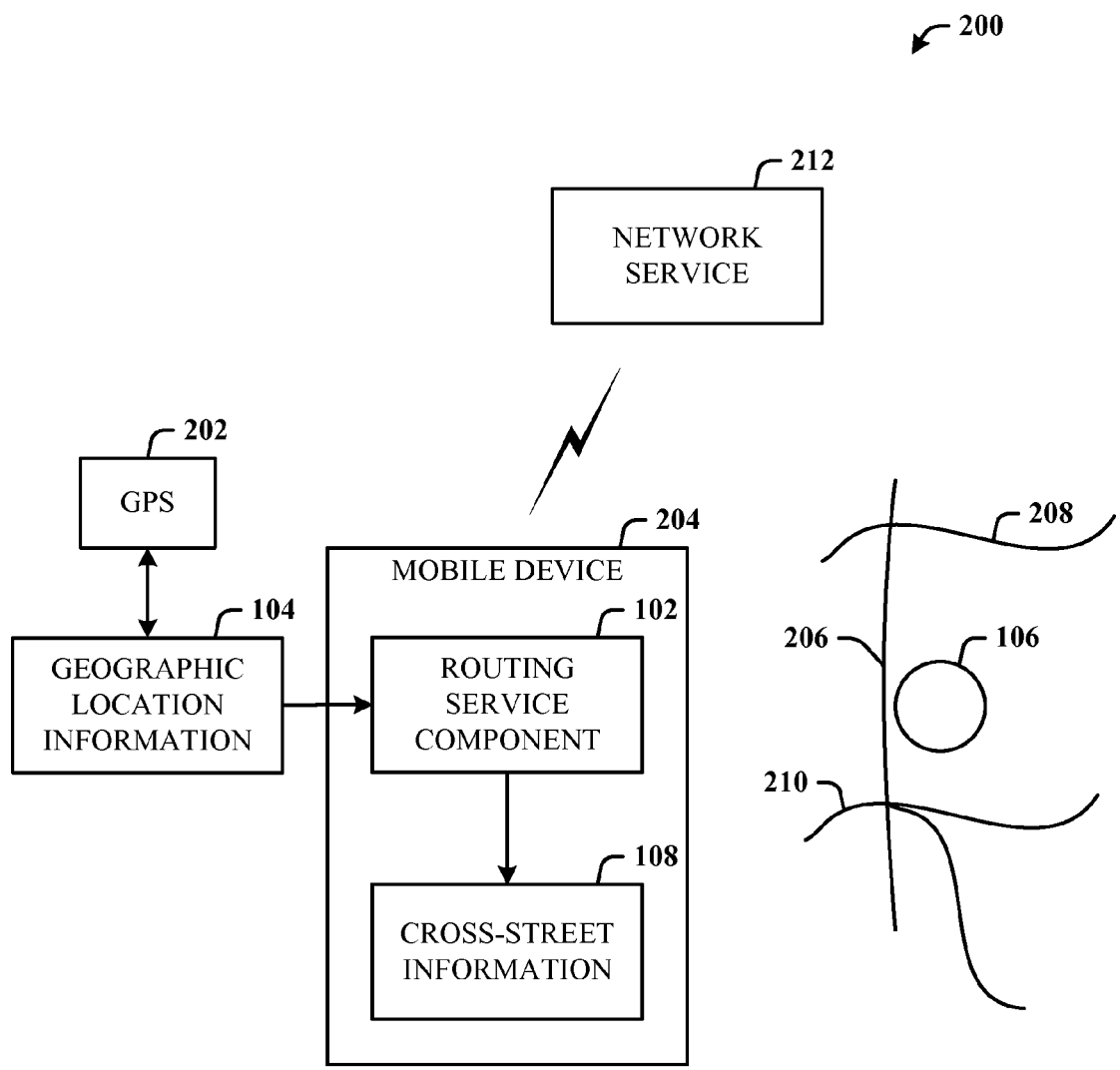
FIG. 2 illustrates an alternative system that computes cross-streets relative to the geographic location.

FIG. 2 illustrates an alternative system 200 that computes cross-streets relative to the geographic location 106. The routing service component 102 receives geographic location information 104 of the geographic location 106 and dynamically outputs cross-street information 108 (e.g., nearest) of the road junction 110 associated with the geographic location 106. The geographic location information 104 can be obtained via GPS 202 that provides suitable geographic location information 104 as input to the routing service component 102, shown as part of a mobile device 204.

The cross-street information 108 includes a primary road identifier (of a primary road 206) and intersecting secondary road identifiers (secondary road (e.g., avenue) 208 and secondary road (e.g., avenue) 210) relative to the geographic location 106. The primary road identifier is a road name of a primary road by the location and the intersecting secondary road identifiers relative to the geographic location include road names of secondary roads on either side of the location 106 that intersect the primary road. The cross-streets can then be computed and provided to the device user as a reference to the primary road 206 (that is nearest the location 106) and the site of the location between two secondary cross-streets (e.g., "on street A (road 206) between avenue B (road 208) and avenue C (road 210)"). As previously indicated, the routing service component 102 can coordinate computation of the cross-street information 108 between a client and a network service 212.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 3:
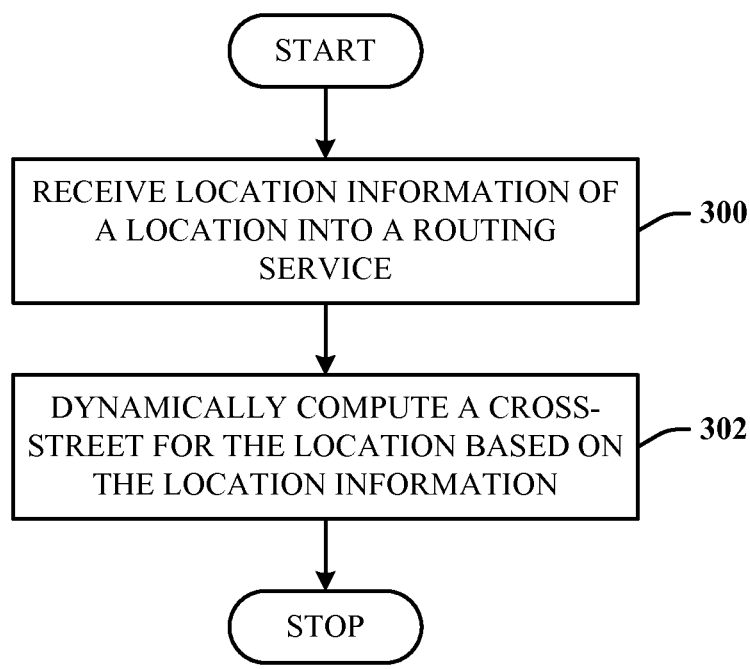
FIG. 3 illustrates a method in accordance with the disclosed architecture.

FIG. 3 illustrates a method in accordance with the disclosed architecture. At 300, location information of a location is received into a routing service. At 302, a cross-street for the location is dynamically computed based on the location information.

Figure 4:
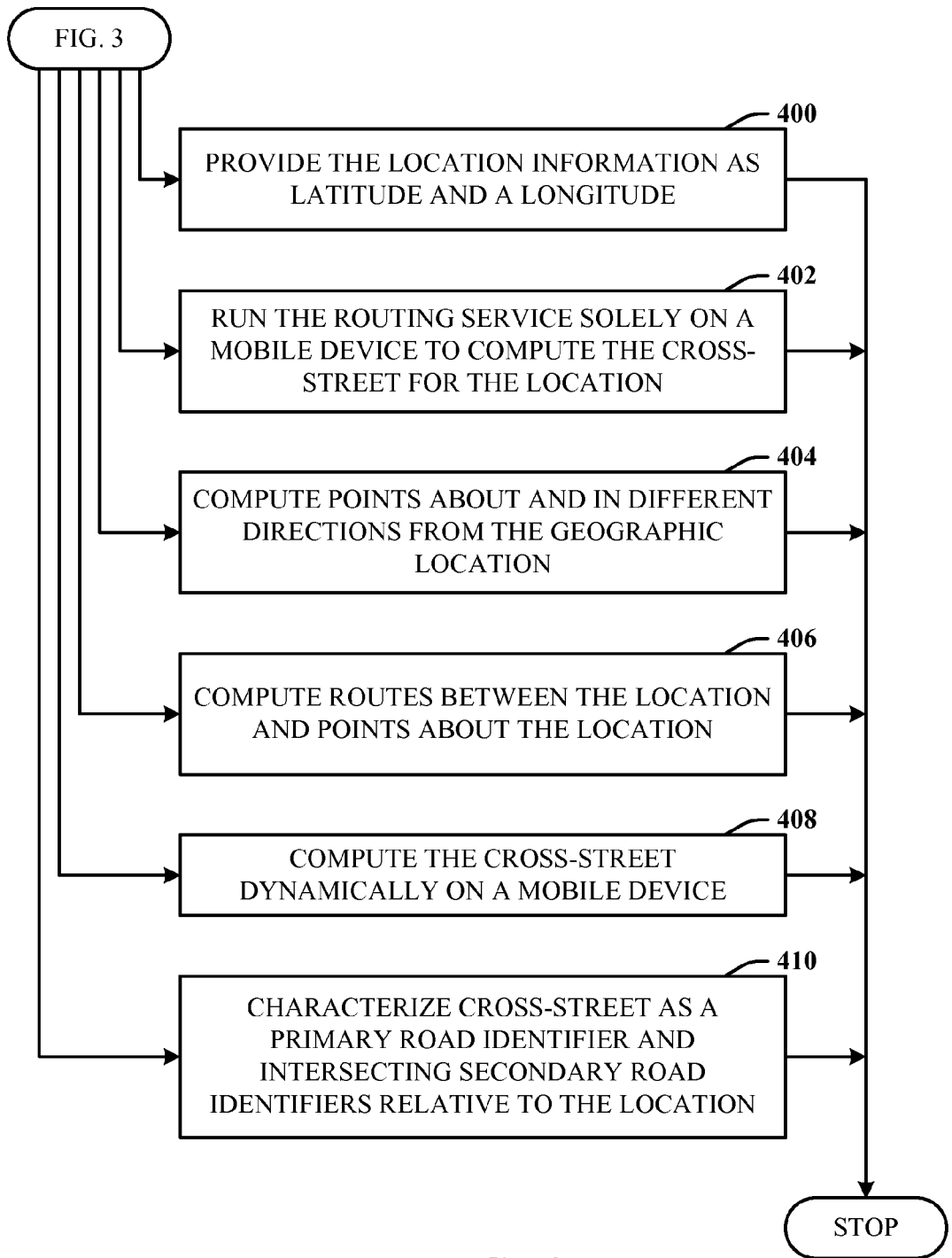
FIG. 4 illustrates further aspects of the method of FIG. 3.

FIG. 4 illustrates further aspects of the method of FIG. 3. Note that the flow indicates that each block can represent a step that can be included, separately or in combination with other blocks, as additional aspects of the method represented by the flow chart of FIG. 3. At 400, the location information is provided as latitude and a longitude. At 402, the routing service is run on a mobile device to compute the cross-street for the location. At 404, points equidistant and in different directions from the geographic location are computed. At 406, routes between the location and points equidistant from the location are computed. At 408, the cross-street is dynamically computed on a mobile device. At 410, the cross-street is characterized as a primary road identifier and intersecting secondary road identifiers relative to the location.

Figure 5:
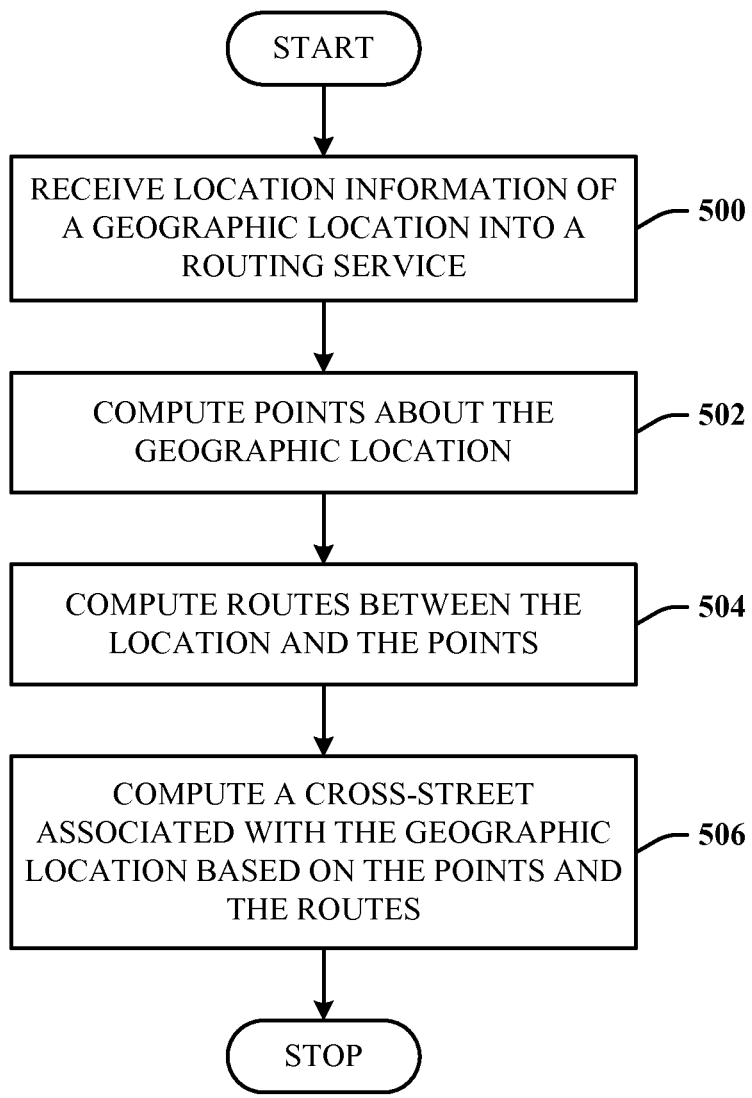
FIG. 5 illustrates an alternative method of computing a cross-street associated with a geographic location.

FIG. 5 illustrates an alternative method of computing a cross-street associated with a geographic location. At 500, location information of a geographic location is received into a routing service. At 502, points about (e.g., equidistant) the geographic location are computed. At 504, routes between the location and the points are computed. At 506, a cross-street associated with the geographic location is computed based on the points and the routes.

Figure 6:
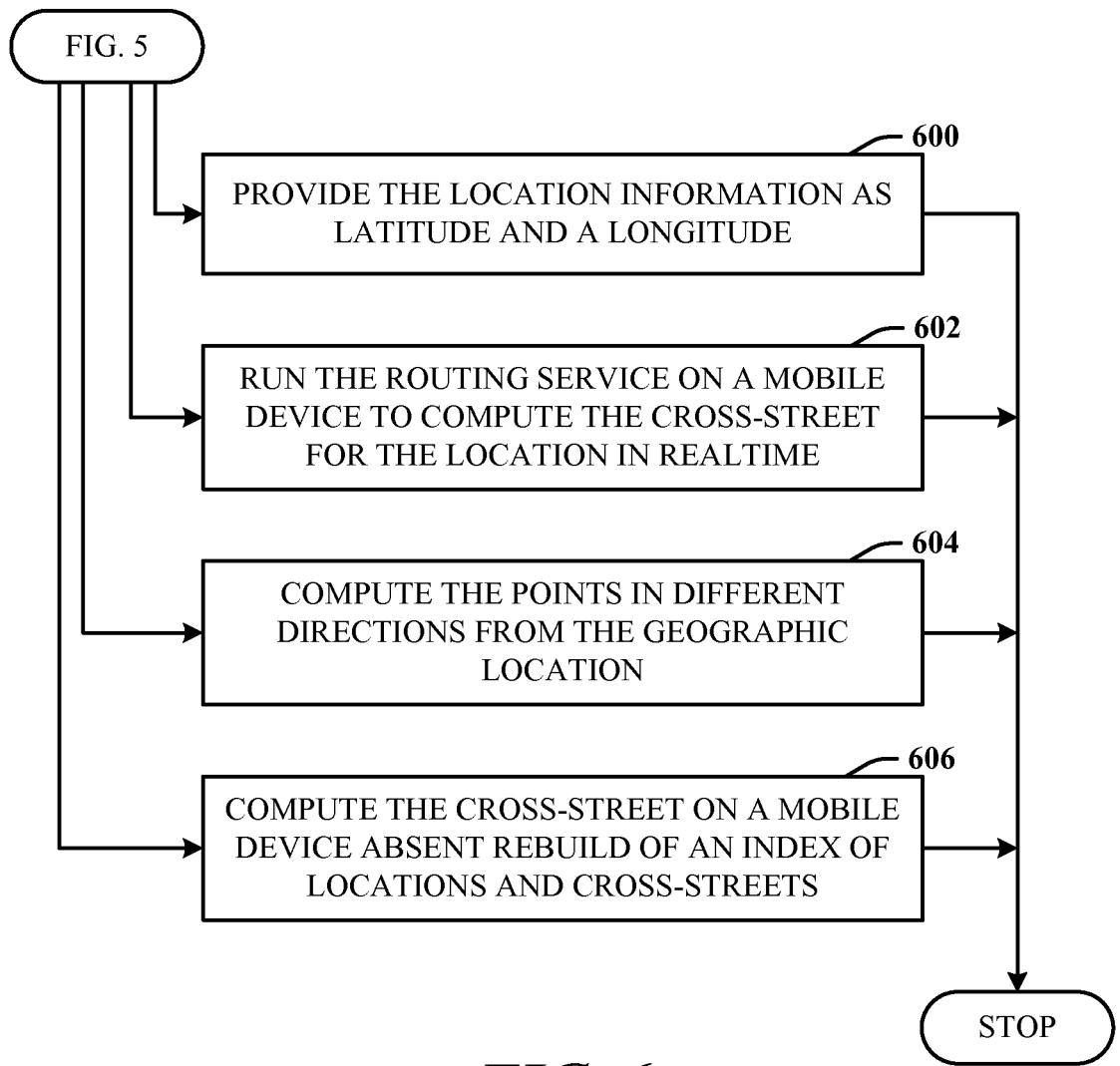
FIG. 6 illustrates further aspects of the method of FIG. 5.

FIG. 6 illustrates further aspects of the method of FIG. 5. Note that the flow indicates that each block can represent a step that can be included, separately or in combination with other blocks, as additional aspects of the method represented by the flow chart of FIG. 5. At 600, the location information is provided as latitude and a longitude. At 602, the routing service is run on a mobile device to compute the cross-street for the location in realtime. At 604, the points are computed in different directions from the geographic location. At 606, the cross-street is computed on a mobile device absent rebuild of an index of locations and cross-streets.

In a more robust implementation, it is possible to output cross-streets that tend to be more commonly known in the community and by visitors trying to navigate the area. In other words, rather than output some obscure cross-street relative to a desired destination, the outputted cross-street(s) are not the closest to the business, but the more commonly known such that the user can be more likely to know where the location is relative to the more commonly known cross-street(s). It can also then be the case where the cross-streets are recomputed as the user gets closer to the desired destination to more quickly route the user to the destination as the user becomes familiar with the area during navigation to the destination. In other words, as the user gets closer to the destination, re-computation is performed dynamically to route the user according to the more obscure streets that may be near the destination, etc.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, a data structure (stored in volatile or non-volatile storage media), a module, a thread of execution, and/or a program. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 7:
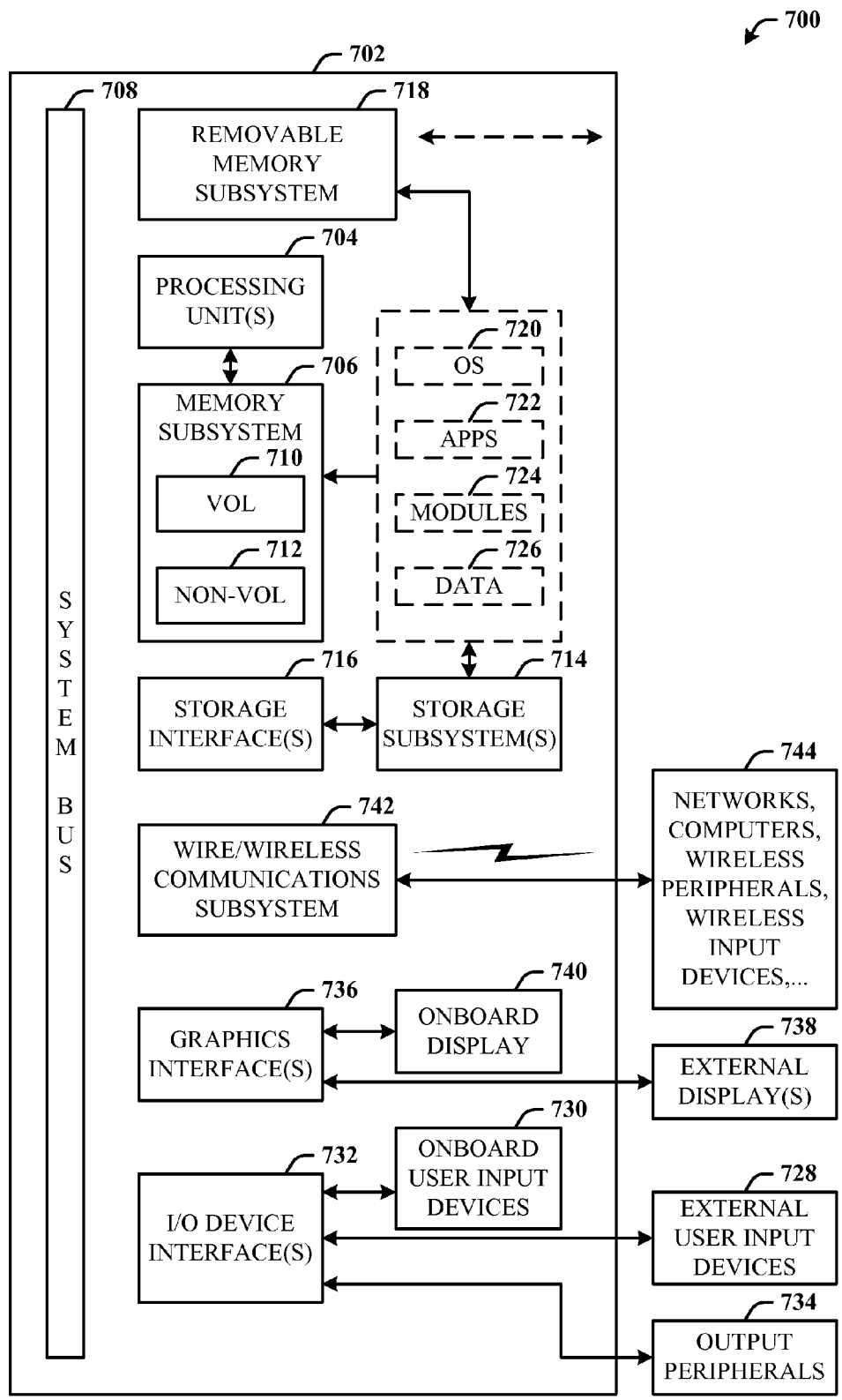
FIG. 7 illustrates a block diagram of a computing system that executes dynamic cross-street computation in accordance with the disclosed architecture.

Referring now to FIG. 7, there is illustrated a block diagram of a computing system 700 that executes dynamic cross-street computation in accordance with the disclosed architecture. However, it is appreciated that the some or all aspects of the disclosed methods and/or systems can be implemented as a system-on-a-chip, where analog, digital, mixed signals, and other functions are fabricated on a single chip substrate. In order to provide additional context for various aspects thereof, FIG. 7 and the following description are intended to provide a brief, general description of the suitable computing system 700 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 700 for implementing various aspects includes the computer 702 having processing unit(s) 704, a computer-readable storage such as a system memory 706, and a system bus 708. The processing unit(s) 704 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 706 can include computer-readable storage (physical storage media) such as a volatile (VOL) memory 710 (e.g., random access memory (RAM)) and non-volatile memory (NON-VOL) 712 (e.g., ROM, EPROM, EEPROM, etc.). A basic input/output system (BIOS) can be stored in the non-volatile memory 712, and includes the basic routines that facilitate the communication of data and signals between components within the computer 702, such as during startup. The volatile memory 710 can also include a high-speed RAM such as static RAM for caching data.

The system bus 708 provides an interface for system components including, but not limited to, the system memory 706 to the processing unit(s) 704. The system bus 708 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 702 further includes machine readable storage subsystem(s) 714 and storage interface(s) 716 for interfacing the storage subsystem(s) 714 to the system bus 708 and other desired computer components. The storage subsystem(s) 714 (physical storage media) can include one or more of a hard disk drive (HDD), a magnetic floppy disk drive (FDD), and/or optical disk storage drive (e.g., a CD-ROM drive DVD drive), for example. The storage interface(s) 716 can include interface technologies such as EIDE, ATA, SATA, and IEEE 1394, for example.

One or more programs and data can be stored in the memory subsystem 706, a machine readable and removable memory subsystem 718 (e.g., flash drive form factor technology), and/or the storage subsystem(s) 714 (e.g., optical, magnetic, solid state), including an operating system 720, one or more application programs 722, other program modules 724, and program data 726.

The operating system 720, one or more application programs 722, other program modules 724, and/or program data 726 can include entities and components of the system 100 of FIG. 1, entities and components of the system 200 of FIG. 2, and the methods represented by the flowcharts of FIGS. 3-6, for example.

Generally, programs include routines, methods, data structures, other software components, etc., that perform particular tasks or implement particular abstract data types. All or portions of the operating system 720, applications 722, modules 724, and/or data 726 can also be cached in memory such as the volatile memory 710, for example. It is to be appreciated that the disclosed architecture can be implemented with various commercially available operating systems or combinations of operating systems (e.g., as virtual machines).

The storage subsystem(s) 714 and memory subsystems (706 and 718) serve as computer readable media for volatile and non-volatile storage of data, data structures, computer-executable instructions, and so forth. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage media, regardless of whether all of the instructions are on the same media.

Computer readable media can be any available media that can be accessed by the computer 702 and includes volatile and non-volatile internal and/or external media that is removable or non-removable. For the computer 702, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 702, programs, and data using external user input devices 728 such as a keyboard and a mouse. Other external user input devices 728 can include a microphone, an IR (infrared) remote control, a joystick, a game pad, camera recognition systems, a stylus pen, touch screen, gesture systems (e.g., eye movement, head movement, etc.), and/or the like. The user can interact with the computer 702, programs, and data using onboard user input devices 730 such a touchpad, microphone, keyboard, etc., where the computer 702 is a portable computer, for example. These and other input devices are connected to the processing unit(s) 704 through input/output (I/O) device interface(s) 732 via the system bus 708, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 732 also facilitate the use of output peripherals 734 such as printers, audio devices, camera devices, and so on, such as a sound card and/or onboard audio processing capability.

One or more graphics interface(s) 736 (also commonly referred to as a graphics processing unit (GPU)) provide graphics and video signals between the computer 702 and external display(s) 738 (e.g., LCD, plasma) and/or onboard displays 740 (e.g., for portable computer). The graphics interface(s) 736 can also be manufactured as part of the computer system board.

The computer 702 can operate in a networked environment (e.g., IP-based) using logical connections via a wired/wireless communications subsystem 742 to one or more networks and/or other computers. The other computers can include workstations, servers, routers, personal computers, microprocessor-based entertainment appliances, peer devices or other common network nodes, and typically include many or all of the elements described relative to the computer 702. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 702 connects to the network via a wired/wireless communication subsystem 742 (e.g., a network interface adapter, onboard transceiver subsystem, etc.) to communicate with wired/wireless networks, wired/wireless printers, wired/wireless input devices 744, and so on. The computer 702 can include a modem or other means for establishing communications over the network. In a networked environment, programs and data relative to the computer 702 can be stored in the remote memory/storage device, as is associated with a distributed system. It will be appreciated that the network connections shown are exemplary and other means of establishing a communications link between the computers can be used.

The computer 702 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi™ (used to certify the interoperability of wireless computer networking devices) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
  a routing service component configured to determine cross-streets associated with a main point of interest by choosing routing points in different directions about the main point of interest, compute routes between the main point of interest and the routing points, and, compute, and output to a device, cross-street information associated with the main point of interest based on the routing points and the routes, wherein the cross-street information includes a road name of a primary road by the main point of interest and road names of secondary roads on either side of the main point of interest that intersect the primary road; and
  a microprocessor configured to execute computer-executable instructions associated with at least the routing service component.

2. The system of claim 1, wherein the cross-street information includes a primary road identifier and intersecting secondary road identifiers relative to the main point of interest.

3. The system of claim 2, wherein the primary road identifier is a road name of a primary road by the main point of interest and the intersecting secondary road identifiers relative to the main point of interest include road names of secondary roads on either side of the main point of interest that intersect the primary road.

4. The system of claim 1, wherein the routing service component operates on a mobile device to compute the cross-street information without accessing a network service to compute the cross-street information.

5. The system of claim 1, wherein the main point of interest is defined by geographical coordinates that include latitude and longitude.

6. The system of claim 1, wherein the routing service component computes the cross-street information dynamically across both a mobile device and a server.

7. The system of claim 1, wherein the routing service component computes the cross-street information dynamically on a mobile device.

8. The system of claim 1, wherein the routing service component coordinates computation of the cross-street information using resources on both a client and a network service.

9. A method performed by a computer system executing machine-readable instructions, the method comprising acts of:
   receiving into a routing service location information of a location comprising a main point of interest;
   computing routing points in different directions about the main point of interest and routes between the main point of interest and the routing points;
   dynamically computing and outputting to a device cross-street information based on the routing points and routes, which cross-street information includes a road name of a primary road by the main point of interest and road names of secondary roads on either side of the main point of interest that intersect the primary road; and
   configuring at least one processor to perform at least one of the acts of receiving, computing routing points, or dynamically computing and outputting.

10. The method of claim 9, further comprising providing the location information as latitude and a longitude.

11. The method of claim 9, further comprising running the routing service solely on a mobile device to compute the cross-street for the location.

12. The method of claim 9, further comprising running the routing service on both a mobile device and a server.

13. The method of claim 9, further comprising computing the site of the location to be on a primary road between two secondary cross-streets.

14. The method of claim 9, further comprising computing the cross-street dynamically on a mobile device.

15. The method of claim 9, further comprising characterizing the cross-street as a primary road identifier and intersecting secondary road identifiers relative to the location.

16. A method performed by a computer system executing machine-readable instructions, the method comprising acts of:
   receiving location information of a geographic location of a main point of interest into a routing service;
   computing routing points in different directions about the main point of interest and routes between the main point of interest and the routing points;
   computing and outputting to a device cross-street information based on the routing points and routes, which cross-street information includes a road name of a primary road by the main point of interest and road names of secondary roads on either side of the main point of interest that intersect the primary road; and
   configuring at least one processor to perform at least one of the acts of receiving, computing routing points, or computing and outputting.

17. The method of claim 16, further comprising providing the location information as latitude and longitude.

18. The method of claim 16, further comprising running the routing service on a mobile device to compute the cross-street for the location in realtime.

19. The method of claim 16, further comprising running the routing service on both a mobile device and a server to compute the cross-street for the location in realtime.

20. The method of claim 16, further comprising computing the cross-street on a mobile device absent rebuild of an index of locations and cross-streets, wherein the cross-street is characterized as a primary road identifier and intersecting secondary road identifiers relative to the location.

21. A system, comprising:
   a routing service component configured to determine commonly-known cross-streets associated with a main point of interest by choosing routing points in different directions about the main point of interest, compute routes between the main point of interest and the routing points, and, compute, and output to a device, commonly-known cross-street information associated with the main point of interest based on the routing points and the routes, wherein the commonly-known cross-street information includes a road name of a primary road by the main point of interest and commonly-known road names of secondary roads on either side of the main point of interest that intersect the primary road; and
   a microprocessor configured to execute computer-executable instructions associated with at least the routing service component.

* * * * *